(12) United States Patent
Li et al.

(10) Patent No.: US 10,592,644 B2
(45) Date of Patent: Mar. 17, 2020

(54) INFORMATION PROTECTION METHOD AND DEVICE BASED ON A PLURALITY OF SUB-AREAS FOR MCU CHIP (71) Applicant: GIGADEVICE SEMICONDUCTOR (BEIJING) INC., Beijing (CN)

(72) Inventors: Baokui Li, Beijing (CN); Jinghua Wang, Beijing (CN); Nanfei Wang, Beijing (CN)

(73) Assignee: GIGADEVICE SEMICONDUCTOR (BEIJING) INC., Beijing (CN)

( * ) Notice: Subject to any disclaimer, the term of this patent is extended or adjusted under 35 U.S.C. 154(b) by 266 days.

(21) Appl. No.: 15/505,616

(22) PCT Filed: Jan. 30, 2015

(86) PCT No.: PCT/CN2015/071983
§ 371 (c)(1),
(2) Date: Feb. 22, 2017

(87) PCT Pub. No.: WO2016/106933
PCT Pub. Date: Jul. 7, 2016

(65) Prior Publication Data
US 2017/0277871 A1 Sep. 28, 2017

(30) Foreign Application Priority Data
Dec. 30, 2014 (CN) .......................... 2014 1 0850607

(51) Int. Cl.
*G06F 3/06* (2006.01)
*G06F 21/12* (2013.01)
(Continued)

(52) U.S. Cl.
CPC ............ *G06F 21/123* (2013.01); *G06F 3/062* (2013.01); *G06F 3/0622* (2013.01);
(Continued)

(58) Field of Classification Search
CPC .... G06F 21/6218; G06F 3/062; G06F 3/0622; G06F 2221/2113; G06F 2221/2143; H04L 63/102; H04L 67/306
See application file for complete search history.

(56) References Cited

U.S. PATENT DOCUMENTS

2008/0263045 A1 10/2008 Soto et al.
2009/0013056 A1* 1/2009 Weinstock ............ G06F 3/1462
709/208

(Continued)

FOREIGN PATENT DOCUMENTS

CN 101123507 A 2/2008
CN 101566972 A 10/2009
(Continued)

Primary Examiner — Ernest Unelus
(74) Attorney, Agent, or Firm — Gokalp Bayramoglu (57) ABSTRACT An information protection method and device based on a plurality of sub-areas for an MCU chip, the MCU chip comprises an instruction bus, a data bus, a flash controller and a user area of a flash memory, the method comprises: determining a preceding sub-area when the instruction bus accesses the user area; entering corresponding preceding sub-area working state; determining the current sub-area when the instruction bus accesses the user area; when the preceding sub-area is inconsistent with the current sub-area, entering the transition state; determining whether the duration of the transition state reaches the preset waiting time; if yes, entering the corresponding current sub-area working state. The information protection method and device prevent the cooperative companies which develop the program together from stealing program from each other.

20 Claims, 4 Drawing Sheets (51) Int. Cl.
*G06F 12/14* (2006.01)
*G06F 21/78* (2013.01)
*G06F 13/42* (2006.01)
*G06F 21/85* (2013.01)
G06F 21/53 (2013.01)
G06F 13/40 (2006.01)

(52) U.S. Cl.
CPC .......... *G06F 3/0644* (2013.01); *G06F 3/0679* (2013.01); *G06F 12/14* (2013.01); *G06F 12/1441* (2013.01); *G06F 12/1491* (2013.01); *G06F 13/4282* (2013.01); *G06F 21/78* (2013.01); *G06F 21/85* (2013.01); *G06F 12/1433* (2013.01); *G06F 13/4022* (2013.01); *G06F 21/53* (2013.01); *G06F 2212/1052* (2013.01); *G06F 2212/214* (2013.01); *G06F 2212/7202* (2013.01); *G06F 2213/0026* (2013.01); *G06F 2221/2113* (2013.01)

(56) References Cited

U.S. PATENT DOCUMENTS

2014/0006692 A1    1/2014  Berntsen et al.
2014/0075567 A1*   3/2014  Raleigh ................ H04W 12/10
                                                    726/26

FOREIGN PATENT DOCUMENTS

| CN | 101566972 A | 10/2009 |
| CN | 103853496 A | 6/2014 |
| CN | 103853496 A | 6/2014 |
| CN | 104123123 A | 10/2014 |

* cited by examiner

INFORMATION PROTECTION METHOD AND DEVICE BASED ON A PLURALITY OF SUB-AREAS FOR MCU CHIP

CROSS-REFERENCE TO RELATED APPLICATIONS

This application is the national phase entry of International Application No. PCT/CN2015/071983, filed Jan. 30, 2015, which is based on and claims priority to Chinese Patent Application No. 201410850607.9, filed on Dec. 30, 2014, entitled "INFORMATION PROTECTION METHOD AND DEVICE BASED ON A PLURALITY OF SUB-AREAS FOR MCU CHIP", the entire contents of which are incorporated herein by reference.

TECHNICAL FIELD

The present disclosure relates to the field of electronic circuit and, more particularly, to an information protection method and device based on a plurality of sub-areas for an MCU chip.

BACKGROUND

With the improvement of integrated circuit (IC), the application of an MCU chip becomes more widely from toys to construction machinery. An MCU chip usually comprises a central processing unit (CPU), a flash, a static random access memory (SRAM) and a variety of peripherals. When the MCU chip is power down, flash content is not lost, while SRAM content is. A flash memory is usually composed of two distinct areas: one is a user area, used to store user's program, the other is an information area, used to store configuration information of the MCU chip. SRAM is usually used as an on-chip memory.

For an MCU application solution provider, a manufacturer who develops program and PCB (printed circuit board) base on the MCU chip, the program will be recorded on the user area of a flash memory. The core value of the application solution provider is the program. Thus, the program should be protected from being stolen by others. The information protection method of an MCU chip is to protect the program stored in the user area of a flash memory from being stolen by others. The current information protection method for an MCU chip is only available to protect the program in the user area as a whole, but not able to protect a program developed by two or more cooperative companies. Because the current method can only be used to protect the program in the user area from being stolen by users, not be used to prevent the cooperative companies from stealing the program from each other.

Therefore, an urgent technical problem to be solved for the technicians in this field is: providing an information protection method for an MCU chip to protect the program from being stolen by users and prevent the companies who developed the program together from stealing program from each other.

SUMMARY

The embodiment of the present disclosure provides an information protection method based on a plurality of sub-areas for an MCU chip to protect the program from being stolen by users and prevent the companies who developed the program together from stealing program from each other.

Accordingly, the present disclosure also provides an information protection device for an MCU chip based on a plurality of sub-areas, to ensure the implementation and application of the method.

To solve the problems above, the present disclosure discloses an information protection method based on a plurality of sub-areas for a micro control unit (MCU): chip, wherein, the MCU chip comprises an instruction bus, a data bus, a flash controller and a user area of a flash memory; the flash controller is configured to divide the user area into a plurality of sub-areas, each sub area is corresponding to a sub-area working state, respectively, the method comprising:

determining a preceding sub-area accessed by the instruction bus when the instruction bus accesses the user area;

entering a preceding sub-area working state corresponding to the preceding sub-area;

determining a current sub-area accessed by the instruction bus when the instruction bus accesses the user area;

if the preceding sub-area is inconsistent with the current sub-area, entering a transition state;

determining whether the duration of the transition state reaches a preset waiting time;

if yes, entering a current sub-area working state corresponding to the current sub-area.

Preferably in the preceding sub-area working state, the instruction bus is allowed to access the user area, the data bus is allowed to access the preceding sub-area, but the data bus is prohibited from accessing the other sub-areas;

in the transition state, the instruction bus is temporarily prohibited from accessing the user area, the data bus is allowed to access the preceding sub-area, but the data bus is prohibited from accessing the other sub-areas;

in the current sub-area working state, the instruction bus is allowed to access the user area, the data bus is prohibited from accessing other sub-areas but allowed to access the current sub-area.

Preferably, the method further comprises:

after resetting the MCU chip, entering an initial state; in the initial state, the instruction bus is allowed to access the user area, the data bus is prohibited from accessing any sub-area.

Preferably, the MCU chip comprises a central processing unit (CPU) with a Harvard architecture; the preset waiting time is correlated with the features of the CPU; if the CPU is ARM Cortex-M3, the preset waiting time is 20 CPU clock cycles.

Preferably, the MCU chip comprises an information area, the information area comprises option bytes; the user area is protected according to reading protection levels, and each sub-area is further protected according to a corresponding reading protection state, respectively; the method further comprising:

according to the option bytes, determining the reading protection level of the user area and the reading protection state of each sub-area.

Preferably, an on-chip private peripheral can be implemented on the MCU chip, there is a corresponding sub-area enabling signal for each sub-area, and the private peripheral is configured to work normally only when the corresponding sub-area enabling signal is high.

Preferably, the private peripheral comprises a static random access memory.

Embodiments of the present disclosure further discloses an information protection device based on a plurality of sub-areas for an MCU chip, wherein, the MCU chip comprises an instruction bus, a data bus, a flash controller and a user area of a flash memory; the flash controller is configured to divide the user area into a plurality of sub-areas, each sub-area is corresponding to a sub-area working state, respectively, the device comprising:

a first determining module, configured to, determine a preceding sub-area accessed by the instruction bus when the instruction bus accesses the user area;

a first entering module, configured to, enter a preceding sub-area working state corresponding to the preceding sub-area;

a second determining module, configured to, determine a current sub-area accessed by the instruction bus for the second time when the instruction bus accesses the user area;

a second entering module, configured to, if the preceding sub-area is inconsistent with the current sub-area, enter the transition state;

a third determining module, configured to, determine whether the duration of the transition state reaches a preset waiting time, if yes, enter a third entering module;

the third entering module, configured to, enter a current sub-area working state corresponding to the current sub-area.

Preferably, in the preceding sub-area working state, the instruction bus is allowed to access the user area, the data bus is allowed to access the preceding sub-area but prohibited from accessing the other sub-areas;

in the transition state, the instruction bus is temporarily stopped from accessing the user area, the data bus is allowed to access the preceding sub-area but prohibited from accessing the other sub-areas;

in the current sub-area working state, the instruction bus is allowed to access the user area, the data bus is prohibited from accessing other sub-area but allowed to access the current sub-area.

Preferably, the device further comprises:

a fourth entering module, configured to, after resetting the MCU chip, enter an initial state, under the initial state, the instruction bus is allowed to access the user area, the data bus is prohibited from accessing any sub-area.

Preferably, the MCU chip comprises a CPU with a Harvard architecture; the preset waiting time is correlated with the features of the CPU; if the CPU is ARM Cortex-M3, the preset waiting time is 20 CPU clock cycles.

Preferably, the MCU chip comprises an information area, the information area comprises option bytes; the user area comprises a reading protection level, the plurality of sub-areas comprise corresponding reading protection states, respectively; the device further comprising:

a state determining module, configured to, determine the reading protection level of the user area and the reading protection states of the plurality of sub-areas according to the option bytes.

Preferably, the MCU chip is designed with a private peripheral, the plurality of sub-areas comprise corresponding sub-area enabling signals, respectively, the private peripheral is configured to work normally when receiving the sub-area enabling signal.

Embodiments of the present disclosure further disclose a computer readable recording medium recorded with a program for executing the method above.

Compared with the current techniques, the embodiment of the present application comprises the following advantages:

In the embodiment of the present disclosure, the flash controller in the MCU chip divides the user area into a plurality of sub-areas, when the instruction bus accesses the user area, the user area can be normally accessed. But the data bus is restricted from accessing the sub-areas. In the embodiment of the present disclosure, when the instruction bus accesses the user area, the data bus is only allowed to access the sub-area accessed by the instruction bus, in this way, it is capable to protect the program in the user area from being stolen by cooperative companies that develop the programs together.

In the embodiment of the present disclosure, the user area is protected according to reading protection levels, and each sub-area is further protected according to a corresponding reading protection state. The reading protection level of the user area and the reading protection state of each sub-area can be determined according to the option bytes. During the cooperative development process of the MCU chip program, in order to prevent cooperative companies from stealing program from each other, after one company accomplishes the development, the reading protection level of the user area may be increased or the reading protection state may be entered. In addition, if someone attempts to steal the authority of accessing programs in the user area by lowering the reading protection level or exiting the reading protection state, all the programs in the user area are erased, which may further protect the company's development efforts.

In the embodiment of the present disclosure, sub-areas may be allocated to different cooperative companies; a peripheral may be designed as a private peripheral for a sub-area; each sub-area has a corresponding sub-area enabling signal, the sub-area enabling signal may control the corresponding private peripheral. For instance, part or all of the functions of a private peripheral may be enabled or disenabled according to the corresponding sub-area enabling signal, which may prevent the intermediate results processed by program from being obtained by other cooperative companies.

DETAILED DESCRIPTION OF INVENTION

In order to make the targets, features and advantages of the present disclosure described above more clear, specific description in conjunction with the accompanying drawings are provided hereinafter.

An embodiment of the present disclosure of an information protection method for an MCU chip is described below.

The reading protection level of the flash controller is controlled by a number of control bytes in an information area of the flash memory. There are three reading protection levels. Features of each level are as follows.

Zero-level reading protection: the user area is completely accessible, operations of reading, writing and erasing are allowed to be performed on the user area; the information area is completely accessible as well.

First-level reading protection: the user area is allowed to be accessed normally when the MCU chip boots from the user area; other booting methods (including booting from other areas and joint test action group (JTAG) and other debugging methods) are not allowed to access the user area, all of reading, writing and erasing operations are not allowed to be performed. At this level, the information area is allowed to be accessed. But if the reading protection level of flash controller is changed to zero level by modifying control bytes, all the information in user area is erased.

Second-level reading protection: the user area can be accessed normally when the MCU chip boots from the user area; other booting methods (including booting from other areas and joint test action group (JTAG) and other debugging methods) are disabled. At this level, the information area is readable, non-writable, and non-erasable.

In the above-mentioned information protection method of the MCU chip, the user area is protected as a whole. If the program of MCU chip is developed by one company, this method is able to meet the demand. But the MCU chip is becoming increasingly complex, so as the program in the MCU chip. The pr gram is required to be developed by two or more companies. The current information protection method fails to satisfy the requirements. The current method is only able to protect the user area from being stolen by users, but not able to prevent cooperative companies from stealing from each other. Based on the above-mentioned requirements, a new information protection method for an MCU chip is further provided by the embodiment of the present disclosure.

The information protection method for an MCU chip proposed by the embodiment of the present disclosure is able to meet the protection needs for program of MCU chips developed by a plurality of cooperative companies. In the embodiment of the present disclosure, the user area is divided into a plurality of sub-areas, and programs of the cooperative companies can be written separately in their own sub-areas. The embodiment of the present disclosure is able to ensure that the programs developed by the plurality of companies may be not only mutually and normally invoked, but also prevented from being stolen by the other companies. Meanwhile, the programs are protected from being stolen by the users. Besides, if SRAM or other peripherals are shared by a plurality of cooperative companies, program might be stolen by the other companies through the shared resources. In the embodiment of the present application, it may also allocate a specific SRAM or a peripheral to one company as a private device to broaden the application range of the embodiment of the present disclosure.

Figure 1:
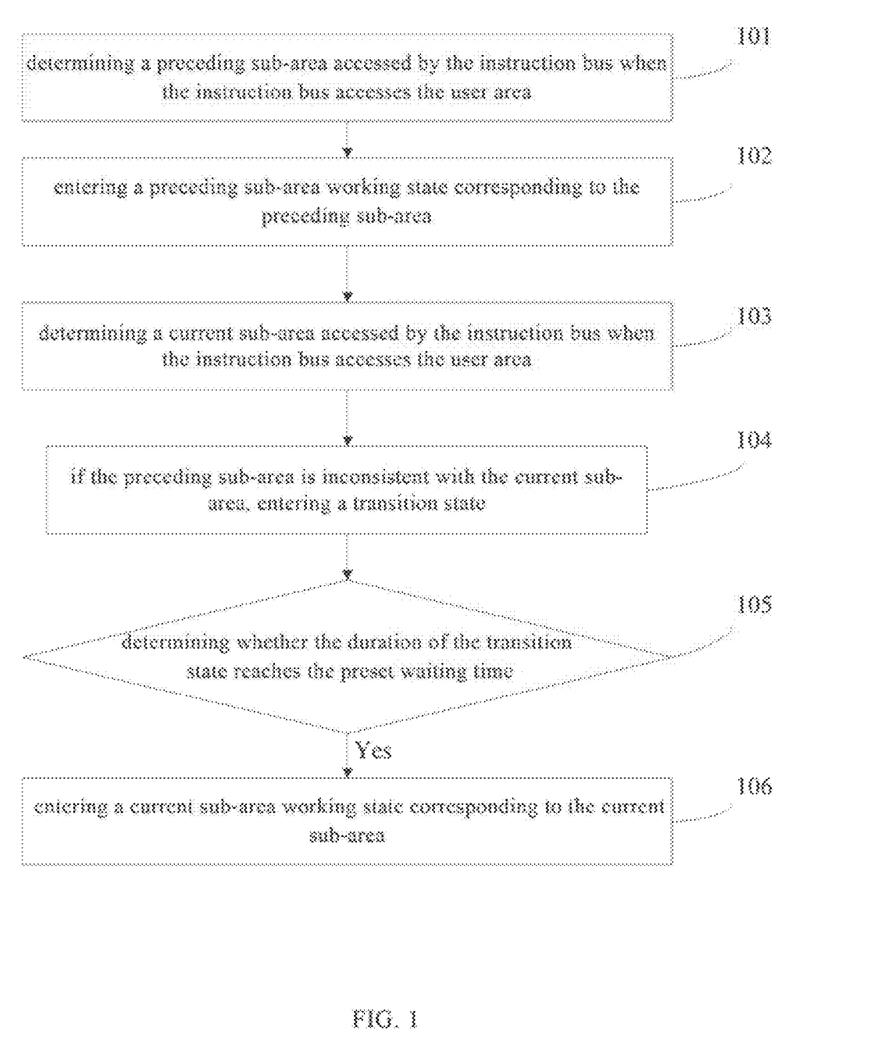
FIG. 1 is a flow chart of an information protection method based on a plurality of sub-areas for an MCU chip according to an embodiment of the present disclosure.

FIG. 1 is a flow chart showing an information protection method based on a plurality of sub-areas for an MCU chip according to an embodiment of the present disclosure, the MCU chip comprises an instruction bus, a data bus, a flash controller and a user area of a flash memory; the flash controller is configured to divide the user area into a plurality of sub-areas, each sub-area is corresponding to a sub-area working state, respectively.

Figure 2:
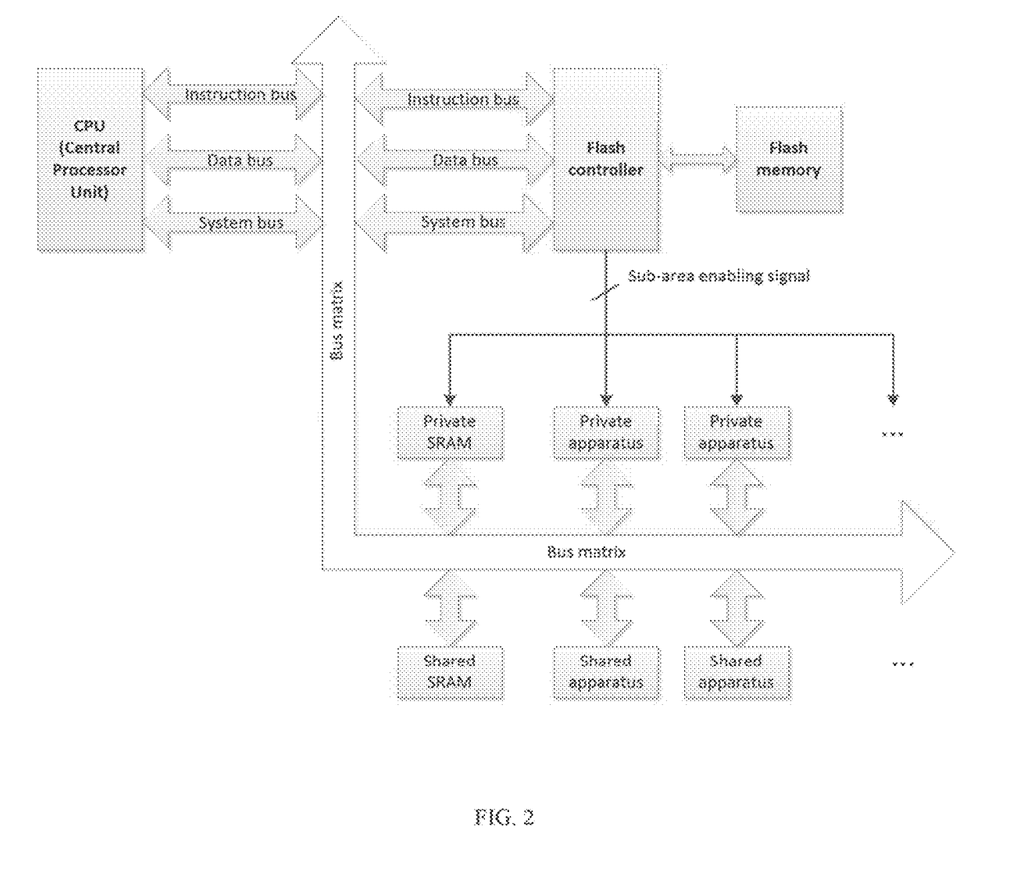
FIG. 2 is a schematic diagram showing the system structure of an MCU chip based on a CPU with a Harvard architecture according to the present disclosure.

According to FIG. 2, which is a schematic diagram showing the system structure of an MCU chip based on a CPU with a Harvard architecture for the present disclosure, the MCU chip usually comprises a CPU, a bus, a flash, a flash controller, a SRAM, a variety of master peripherals and slave peripherals and so on. The bus may comprise an instruction bus, a data bus and a system bus. In the specific implementation, CPU is connected with bus matrix through an instruction bus, a data bus and a system bus. The instruction bus is responsible for reading the instructions; the data bus is responsible for data access; the system bus is responsible for accessing peripherals.

The flash controller of the MCU chip is a bridge for connecting the bus and the flash. The flash controller is connected with bus matrix also through the three buses. The instruction bus is responsible for accepting the instruction access from the CPU, the data bus is responsible for accepting CPU data access. The configuration registers of the flash controller are accessed through the system bus. SRAM and all kinds of peripherals are both connected with bus matrix. In the embodiment of present disclosure, if the program of the MCU chip is cooperatively developed by a plurality of companies, the plurality of sub-areas can be allocated to a plurality of companies. A peripheral can be designed as the private peripheral for one sub-area. Each sub-area is corresponding to a sub area enabling signal. The private peripheral is controlled by the sub-area enabling signal output by the flash controller.

The above-mentioned "access" comprises all kinds of operations. The operations for bus of MCU chip comprising reading and writing which means that the bus access comprises operations of reading and writing. The operations for a flash memory comprise reading, writing and erasing, meaning the access to a flash memory comprises operations including reading, writing and erasing.

The above-mentioned method specifically comprises the following steps:

step 101, determining a preceding sub-area accessed by the instruction bus when the instruction bus accesses the user area;

step 102, entering a preceding sub-area working state corresponding to the preceding sub-area;

step 103, determining a current sub-area accessed by the instruction bus when the instruction bus accesses the user area;

step 104, if the preceding sub-area is inconsistent with the current sub-area, entering a transition state;

step 105, determining whether the duration of the transition state reaches a preset waiting time, if yes, performing step 106;

step 106, entering a current sub-area working state corresponding to the current sub-area.

In a preferred embodiment of the present disclosure:

in the preceding sub-area working state, the instruction bus is allowed to access the user area, the data bus is allowed to access the preceding sub-area, but the data bus is prohibited from accessing the other sub-areas;

in the transition state, the instruction bus is temporarily prohibited from accessing the user area, the data has is allowed to access the preceding sub-area, but the data bus is prohibited from accessing the other sub-areas;

in the current sub-area working state, the instruction has is allowed to access the user area, the data bus is prohibited from accessing other sub-areas but allowed to access the current sub-area.

The application of the present embodiment at least has the following two advantages: firstly, the content in flash is protected from being stolen by users; secondly, the cooperative companies which develop the program together are prevented from stealing from each other.

There are definitely a company which develops the main program and a plurality of other companies which develop the library functions. Where, the former is called the master company, while the latter are called the slave companies hereinafter. The cooperative companies have corresponding sub-areas, respectively. Preferably; the master sub-area is located in the starting address space in the user area, while the slave sub-areas are located in the following address space in the user area. So, when the MCU chip boots, the program in the master sub-area can be executed first. The information protection method for an MCU chip in the present embodiment can be described in three parts: the first part is sub-area protection method; the second part is definition and application method of reading protection; the third part is the implementation method of private peripheral. The first two parts are implemented in the flash controller while the third part is implemented according to the sub-area enabling signal output by the flash controller in the private peripheral.

The first part: sub-area protection method.

When the MCU drip boots from the user area, the user area may be normally accessed by the CPU instruction bus and restrictedly accessed by the CPU data bus, but is not allowed to be accessed by other master peripherals.

Figure 3:
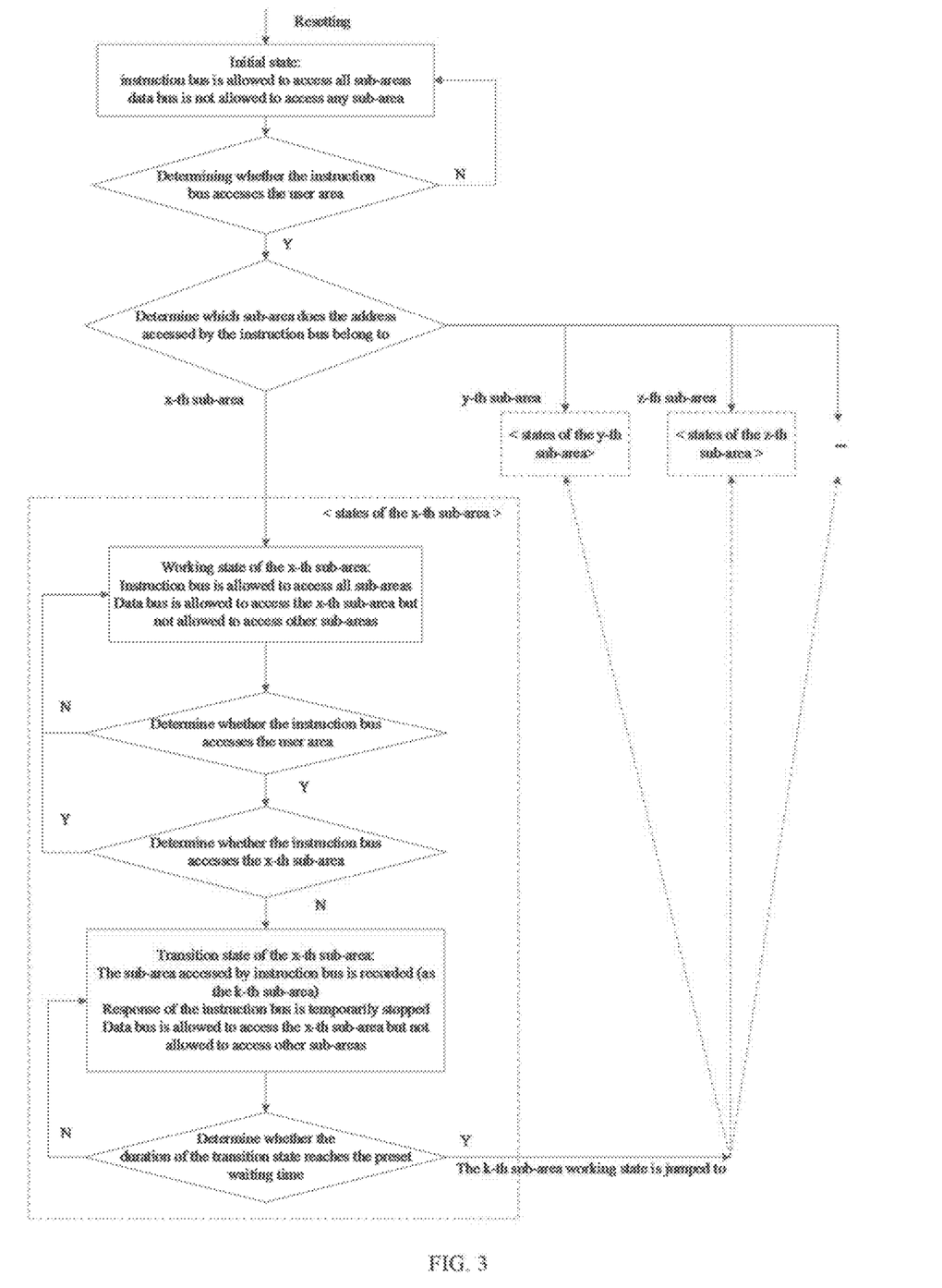
FIG. 3 is a schematic diagram showing the work flow of a flash controller in an MCU chip based on a plurality of sub-areas according to the present disclosure.

According to the schematic diagram of the work flow of a flash controller in an MCU chip based on a plurality of sub-areas for the present disclosure shown in FIG. 3, in the present embodiment, the user area is divided into a plurality of sub-areas with a number of n, each sub-area. is corresponding to a working state, a transition state and a series of determination conditions. FIG. 3 describes the states of the x-th sub-area in detail, while the states of the other sub areas are similar. The number of sub-areas and the number of sub-area working states are consistent. For better understanding, in the following steps, only the working states of the x-th, y-th and z-th sub-areas are described, while other sub-area working states are omitted, but it should not be understood that the embodiments of the present application have only the x-th sub-area working state, the y-th sub-area working state, and the z-th sub-area working state. Where, x, y, z and k are ally positive integers larger than or equal to 1 and less than or equal to n, x, y and z are not equal to each other, and k is not equal to x. If n is equal to 2, which is special, there are only two positive integers between 1 and n. Under this circumstance, z does not exit. The specific steps are as follows:

After resetting the MCU chip, the flash controller enters an initial state. In the initial state, the instruction bus is allowed to access all of the sub-areas, the data bus is not allowed to access any sub-area. If the instruction bus does not access the user area, the flash controller stays in the initial state; otherwise, according to the sub-area that the address accessed by the instruction bus belongs to, the corresponding working state of the sub-area is jumped to.

In the working state of x-th sub-area, the instruction bus is allowed to access all of the sub-areas, the data bus is only allowed to access the x-th sub-area, but not allowed to access other sub-areas (if other sub areas are accessed by the data bus, an error response is returned). If the instruction bus does not access the user area, the flash controller stays in the current state; otherwise, if the instruction bus accesses the x-th sub-area, the flash controller stays in the current sub-area working state, if the instruction bus accesses other sub-areas, the transition state of the x-th sub-area is jumped to.

In the transition state of the x-th sub-area, firstly, the sub-area accessed by the instruction bus is recorded (as the k-th sub-area), at the same time, the instruction bus is temporarily prohibited from accessing the user area, the data bus is allowed to access the x-th sub-area but not allowed to access other sub-areas (when other sub-areas are accessed by the data bus, an error response is returned). If the duration of the transition state does not reach the preset waiting time, the flash controller stays in the current state, otherwise, the k-th sub-area working state is jumped to.

In a detailed embodiment of the present disclosure, the preset waiting time at the transition state is correlated with the CPU features of the MCU chip. The CPU with a Harvard architecture reads the instructions through the instruction bus, accesses data through the data bus. The two operations work in parallel. The CPU obtains the instruction through the instruction bus, then determines whether to access data, and data of which address is ought to be accessed through instruction parsing, then accomplishes corresponding data accessing through data bus.

The procedure from reading instructions by the instruction bus to accomplishing corresponding data accessing by the data bus goes through a number of cycles. The transition state is to make sure that the data accessing corresponding to the instruction for current working sub-area is accomplished, meanwhile prevent the instruction bus from accessing other sub-areas. When the data accessing for current working sub-area is accomplished, a new sub-area working state is jumped to. The waiting time needs to be long enough to ensure the data accessing of the current working sub-area is completely accomplished. Take ARM Cortex-M3 as an example, the waiting time can be set as 20 CPU clock cycles.

The second part: definition and application method of reading protection.

In a preferred embodiment, the MCU chip comprises an information area of a flash memory, the information area comprises option bytes; the user area is protected according to reading protection levels, the sub-areas may be further protected according to corresponding reading protection states; the method may further comprise the following step:

determining the reading protection level of the user area and the reading protection states of the plurality of sub-areas according to the option bytes.

The reading protection is used to restrict the accessing of the user area by all kinds of debugging methods. The debugging methods refer to all booting methods except booting from the user area, as well as debugging methods such as Joint Test Action Group (JTAG). At the above-mentioned reading protection level or in the above-mentioned reading protection states, if booting from the user area, the user area can be accessed by CPU according to the sub-area protection methods.

There are three reading protection levels, including a zero-level, a first-level and a second-level. The reading protection states are only valid at the first reading protection level, and each sub-area of the user area is corresponding to a sub-area reading protection state. The reading protection states of a plurality of sub-areas can be valid or invalid at the same time. The control method that the option bytes controls the reading protection levels and the reading protection states is optional, as long as the reading protection levels and the reading protection states can be distinguished and switched according to the above requirements. A control method is described below as an embodiment. The reading protection level is controlled by one byte: when the byte is 0xA5 (0x represents the Hexadecimal number of A5), the reading protection level is zero-level; when the byte is 0xFF, the reading protection level is first-level; when the byte is 0x5A, the reading protection level is second-level. Each sub-area is corresponding to a reading protection state, and each reading protection state is corresponding to a byte: if the byte is 0xFF, the corresponding reading protection state of the sub-area is invalid; if the byte is 0x00, the corresponding reading protection state of the sub-area is valid.

The features of the reading protection level and the reading protection state are described below:

the zero reading protection level is a default setting of the MCU chip. At the zero reading protection level, the user area can accept all kinds of debugging methods, the option bytes is allowed to accept all operations of reading, writing and erasing.

the first reading protection level is for the companies who develop the program cooperatively. At the first reading protection level, each sub-area in the user area is corresponding to a reading protection state. When the reading protection state is invalid, the corresponding sub-area is allowed to be accessed by all kinds of debugging methods; when the reading protection state is valid, the corresponding sub-area is not allowed to be accessed by any debugging method. The default setting of the MCU chip is that the reading protection state of each sub-area is invalid. The option byte is allowed to accept operations of reading, writing and erasing. Namely, the reading protection state and the reading protection level can be arbitrarily changed. However, once a valid reading protection state is changed into invalid, all the contents in the corresponding sub-area are erased automatically before the reading protection state becomes invalid; if the reading protection level is changed into zero-level, all the contents in the user area are erased automatically before the reading protection level becomes zero-level.

the second reading protection level is the reading protection level when the MCU chip is given to the end users. At the second reading protection level, all kinds of debugging methods are disabled, the option bytes is only allowed to accept reading options, not allowed to accept options of writing or erasing.

The third part: implementation method of private peripheral.

In a preferred embodiment of the present disclosure an on-chip private peripheral can be implemented on the MCI chip. Each sub-area is corresponding to a sub-area enabling signal, respectively. The private peripheral can be configured to work normally only when the corresponding sub-area enabling signal is high.

In the embodiment of the present disclosure, the private peripheral is a peripheral controlled by a sub-area enabling signal output by the flash controller. Each sub-area may correspond to a 1-bit sub-area enabling signal. The sub-area enabling signal indicates that the corresponding sub-area is at working state. For instance, the value of sub-area enabling signal is high at the corresponding sub-area working state and the sub-area transition state, while the value is 0 at the other states. The controlling method is to enable or disenable parts or all of the functions of the corresponding peripheral according to the value of the sub-area enabling signal.

For instance, to ensure one private SRAM is only allowed to be read by the program of the master company, a master sub-area enabling signal can be used as a reading channel enabling signal for the SRAM; to make sure the operation results register of one private peripheral is only allowed to be read by the program of a slave company, the slave sub-area enabling signal can be used as the reading enabling signal for the operation results register; to make sure one private peripheral is only allowed to be configured by the program of the master company, the master sub-area enabling signal can be used as the configuration enabling signal for the peripheral register.

Apparently, the design of private peripheral is optional in practice. That is, all of the peripherals may be shared. The present embodiment is not restricted hereto.

It should be noted that, for the convenience of description, the embodiments of the present disclosure are all depicted as series of action combination. But one skilled in the art shall be aware that the embodiment is not restricted to the action sequence, because some of the steps may be performed in other sequences or simultaneously according to the embodiments. Besides, one skilled in the art shall also be aware that the embodiments depicted in the detailed description part are all preferred embodiments, the related actions may not be necessary for the embodiments of the present disclosure.

Figure 4:
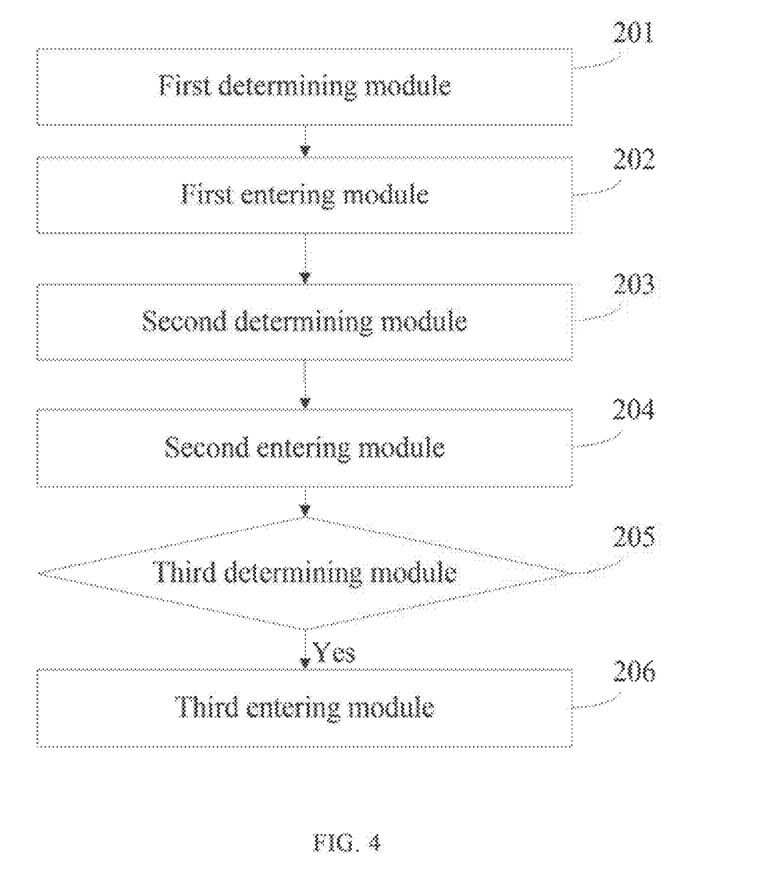
FIG. 4 is a block diagram showing an information protection device based on a plurality of sub-areas for an MCU chip according to the present disclosure.

FIG. 4 is a structural block diagram showing an information protection device for an MCU chip of the present disclosure, the MCU chip may comprise an instruction bus, a data bus, a flash controller and a user area of a flash memory. The flash controller is configured to divide the user area into a plurality of sub-areas, each sub-area is corresponding to a sub-area working state, respectively; the device may comprise the specific modules as below:

a first determining module 201, configured to, determine a preceding sub-area accessed by the instruction bus when the instruction bus accesses the user area;

a first entering module 202, configured to, enter a sub-area working state corresponding to the preceding sub-area;

a second determining module 203, configured to, determine a current sub-area accessed by the instruction bus for the second time when the instruction bus accesses the user area;

a second entering module 204, configured to, enter a transition state if the preceding sub-area is inconsistent with the current sub-area;

a third determining module 205, configured to, determine whether the duration of the transition state reaches a preset waiting time; if yes, enter a third entering module 206;

the third entering module 206, configured to, enter a current sub-area working state corresponding to the current sub-area.

In a preferred embodiment of the present disclosure, in the preceding sub-area working state, the instruction bus is allowed to access the user area, the data bus is allowed to access the preceding sub-area but prohibited from accessing the other sub-areas;

in the transition state, the instruction bus is temporarily stopped from accessing the user area, the data bus is allowed to access the preceding sub-area but prohibited from accessing the other sub-areas;

in the current sub-area working state, the instruction bus is allowed to access the user area, the data bus is prohibited from accessing other sub-area but allowed to access the current sub-area.

In a preferred embodiment of the present disclosure, the device further comprises the following module:

a fourth entering module, configured to, after resetting the MCU chip, enter an initial state, in the initial state, the instruction bus is allowed to access the user area, the data bus is prohibited from accessing any sub-area.

In a preferred embodiment of the present disclosure, the MCU chip comprises a CPU, the CPU has a Harvard architecture; the preset waiting time is correlated with the CPU features; the CPU is ARM Cortex-M3, the preset waiting time is 20 CPU clock cycles.

In a preferred embodiment, the MCU chip may comprise an information area, the information area may comprise option bytes; the user area comprises a reading protection level, the plurality of sub-areas may comprise corresponding reading protection states; the device may further comprise the following module:

a state determining module, configured to, determine the reading protection level of the user area and the reading protection states of the plurality of sub-areas based on the option bytes.

In a preferred embodiment, the MCU chip may be designed with a private peripheral, the plurality of sub-areas may comprise corresponding sub-area enabling signals, respectively, the private peripheral may be configured to work normally when sub-area enabling signals are received.

In a preferred embodiment, the private peripheral may comprise a static random access memory (SRAM).

Considering that the theories of the embodiments of the device are similar with the mentioned embodiments of method, the description of the former is relatively simple. The similar pails may be referred to the descriptions for embodiments of the method.

The embodiment of the present disclosure further provides a computer readable recording medium recorded with a program for executing the program of the above embodiments.

The computer readable recording medium comprises all kinds of mechanisms for information storing and transmitting. The mechanisms shall be in form of machine-readable (e.g., computer readable). For instance, the machine-readable medium includes read-only memory (ROM), random access memory (RAM), disk memory media, optical memory media, flash media; electrical, optical, acoustic or other forms of propagated signals (e.g., carrier signal, infrared signal, digital signal, etc.) etc.

The embodiments in the present disclosure are disclosed progressively, each embodiment mainly emphasizes the differences from other embodiments, while similar parts for different embodiments may be referred to each other.

The above describes the details of an information protection method and device based on a plurality of sub-areas for an MCU chip. The present disclosure applies specific embodiments to explain the theory and implementation method and describe the method and core ideas. Meanwhile, one skilled in the art may make modification or improvement on the basis of the present disclosure on the implementation methods or application scope. To sum up, the description above may not be taken as restriction to the disclosure.

What is claimed is:

1. An information protection method based on a plurality of sub-areas the method comprising:
    having a micro control unit (MCU) chip being comprised of an instruction bus, a data bus, a flash controller and a user area of a flash memory storing programs, wherein the flash controller is configured to divide the user area into a plurality of sub-areas, each sub-area corresponds to a sub-area working state, respectively,
    determining a preceding sub-area accessed by the instruction bus when the instruction bus accesses the user area;
    entering a preceding sub-area working state corresponding to the preceding sub-area;
    determining a current sub-area accessed by the instruction bus when the instruction bus accesses the user area;
    when the preceding sub-area is inconsistent with the current sub-area, enter a transition state;
    determining whether a duration of the transition state reaches a preset waiting time;
    when the duration of the transition state reaches the present waiting time,
    enter a current sub-area working state corresponding to the current sub-area;
    wherein the user area is protected by a plurality of reading protection levels and each sub-area is further protected by a plurality of corresponding reading protection states and when an attempt to steal the programs is made either by lowering one of the reading protection levels or exiting the reading protection state, then all the programs in the user area are erased.

2. The method according to claim 1, wherein,
    in the preceding sub-area working state, the instruction bus is allowed to access the user area, the data bus is allowed to access the preceding sub-area, but the data bus is prohibited from accessing sub-areas other than the preceding sub-area;
    in the transition state, the instruction bus is temporarily prohibited from accessing the user area, the data bus is allowed to access the preceding sub-area, but the data bus is prohibited from accessing sub-areas other than the preceding sub-area;
    in the current sub-area working state, the instruction bus is allowed to access the user area, the data bus is prohibited from accessing sub-areas other than the preceding sub-area but allowed to access the current sub-area.

3. The method according to claim 1, wherein, the method further comprises:
    after resetting the MCU chip, entering an initial state; in the initial state, the instruction bus is allowed to access the user area, the data bus is prohibited from accessing any sub-area.

4. The method according to claim 1, wherein, the MCU chip comprises a central processing unit (CPU) with a Harvard architecture; the preset waiting time is correlated with features of the CPU; if the CPU is ARM Cortex-M3, the preset waiting time is 20 CPU clock cycles.

5. The method according to claim 1, wherein, the MCU chip comprises an information area of the flash memory, the information area comprises option bytes; the method further comprising:
    Determining a reading protection level from the plurality of reading protection levels of the user area and the plurality of corresponding reading protection states of the plurality of sub-areas according to the option bytes.

6. The method according to claim 1, wherein, an on-chip private peripheral is implemented on the MCU chip, each sub-area corresponds to a sub-area enabling signal, and the on-chip private peripheral is configured to work normally only when a corresponding sub-area enabling signal is high.

7. The method according to claim 6, wherein, the on-chip private peripheral comprises a static random access memory.

8. An information protection device based on a plurality of sub-areas the information protection device comprising:
    a micro control unit (MCU) chip being comprised of an instruction bus, a data bus, a flash controller and a user area of a flash memory storing programs, wherein the flash controller is configured to divide the user area into a plurality of sub-areas, each sub-area corresponds to a sub-area working state, respectively,
    a memory having instructions stored thereon;
    a processor configured to execute the instructions to perform operations for information protection, comprising:
    determining a preceding sub-area accessed by the instruction bus when the instruction bus accesses the user area;
    entering a preceding sub-area working state corresponding to the preceding sub-area;

determining a current sub-area accessed by the instruction bus when the instruction bus accesses the user area;
when the preceding sub-area is inconsistent with the current sub-area, enter a transition state;
determining whether a duration of the transition state reaches a preset waiting time;
when the duration of the transition state reaches the present waiting time,
enter a current sub-area working state corresponding to the current sub-area;
the user area comprises a plurality of reading protection levels,
the plurality of sub-areas comprise a plurality of corresponding reading protection states;
and when an attempt to steal the programs is made either by lowering one of the reading protection levels or exiting the reading protection state, then all the programs in the user area are erased.

9. The information protection device according to claim 8, wherein,
in the preceding sub-area working state, the instruction bus is allowed to access the user area, the data bus is allowed to access the preceding sub-area but prohibited from accessing sub-areas other than the preceding sub-area;
in the transition state, the instruction bus is temporarily prohibited from accessing the user area, the data bus is allowed to access the preceding sub-area but prohibited from accessing sub-areas other than the preceding sub-area;
in the current sub-area working state, the instruction bus is allowed to access the user area, the data bus is prohibited from accessing sub-areas other than the preceding sub-area but allowed to access the current sub-area.

10. The information protection device according to claim 8, wherein, the operations that the processor is further configured to execute the instructions to perform comprise:
after resetting the MCU chip, entering an initial state, in the initial state, the instruction bus is allowed to access the user area, the data bus is prohibited from accessing any sub-area.

11. The information protection device according to claim 8, wherein, the MCU chip comprises a CPU with a Harvard architecture; the preset waiting time is correlated with features of the CPU; if the CPU is ARM Cortex-M3, the preset waiting time is 20 CPU clock cycles.

12. The information protection device according to claim 8, wherein, the MCU chip comprises an information area, the information area comprises option bytes; the operations that the processor is further configured to execute the instructions to perform comprise:
determining a reading protection level from the plurality of reading protection levels of the user area and the plurality of corresponding reading protection states of the plurality of sub-areas according to the option bytes.

13. The information protection device according to claim 8, wherein, an on-chip private peripheral is implemented on the MCU chip, each sub-area corresponds to a sub-area enabling signal, and the on-chip private peripheral is configured to work normally only when a corresponding sub-area enabling signal is high.

14. A non-transitory computer readable recording medium having computer programs stored thereon for information protection based on a plurality of sub-areas
the non-transitory computer readable recording medium further including a micro control unit (MCU) chip being comprised of an instruction bus, a data bus, a flash controller and a user area of a flash memory storing programs, wherein the flash controller is configured to divide the user area into a plurality of sub-areas, each sub-area corresponds to a sub-area working state, respectively,
when the computer programs are executed by one or more processors of an electronic apparatus, the electronic apparatus is caused to perform:
determining a preceding sub-area accessed by the instruction bus when the instruction bus accesses the user area;
entering a preceding sub-area working state corresponding to the preceding sub-area;
determining a current sub-area accessed by the instruction bus when the instruction bus accesses the user area;
when the preceding sub-area is inconsistent with the current sub-area, enter a transition state;
determining whether duration of the transition state reaches a preset waiting time;
when the duration of the transition state reaches the present waiting time,
enter a current sub-area working state corresponding to the current sub-area;
the user area comprises a plurality of reading protection levels,
the plurality of sub-areas comprise a plurality of corresponding reading protection states;
and when an attempt to steal the computer programs is made either by lowering one of the reading protection levels or exiting the reading protection state, then all the computer programs in the user area are erased.

15. The non-transitory computer readable recording medium according to claim 14, wherein,
in the preceding sub-area working state, the instruction bus is allowed to access the user area, the data bus is allowed to access the preceding sub-area, but the data bus is prohibited from accessing sub-areas other than the preceding sub-area;
in the transition state, the instruction bus is temporarily prohibited from accessing the user area, the data bus is allowed to access the preceding sub-area, but the data bus is prohibited from accessing sub-areas other than the preceding sub-area;
in the current sub-area working state, the instruction bus is allowed to access the user area, the data bus is prohibited from accessing sub-areas other than the preceding sub-area but allowed to access the current sub-area.

16. The non-transitory computer readable recording medium according to claim 14, wherein, the method further comprises:
after resetting the MCU chip, entering an initial state; in the initial state, the instruction bus is allowed to access the user area, the data bus is prohibited from accessing any sub-area.

17. The non-transitory computer readable recording medium according to claim 14, wherein, the MCU chip comprises a central processing unit (CPU) with a Harvard architecture; the preset waiting time is correlated with features of the CPU; if the CPU is ARM Cortex-M3, the preset waiting time is 20 CPU clock cycles.

18. The non-transitory computer readable recording medium according to claim 14, wherein, the MCU chip comprises an information area, the information area comprises option bytes; the electronic apparatus is further caused to perform:

determining a reading protection level from the plurality of reading protection levels of the user area and the plurality of corresponding reading protection states of the plurality of sub-areas according to the option bytes.

19. The non-transitory computer readable recording medium according to claim 14, wherein, an on-chip private peripheral is implemented on the MCU chip, each sub-area corresponds to a sub-area enabling signal, and the private peripheral is configured to work normally only when a corresponding sub-area enabling signal is high.

20. The non-transitory computer readable recording medium according to claim 19, wherein, the private peripheral comprises a static random access memory.

\* \* \* \* \*